United States Patent [19]
Welker

[11] Patent Number: 5,892,929
[45] Date of Patent: Apr. 6, 1999

[54] AVOIDING NON-UNIQUE IDENTIFIERS FOR BUS DEVICES

[75] Inventor: Mark W. Welker, Spring, Tex.

[73] Assignee: Compaq Computer Corp., Houston, Tex.

[21] Appl. No.: 777,230

[22] Filed: Dec. 30, 1996

[51] Int. Cl.[6] .................................................. G06F 13/376
[52] U.S. Cl. ........................ 395/287; 395/280; 395/283; 395/299
[58] Field of Search .................................. 395/287, 280, 395/304, 299, 283; 340/825.5; 711/100

[56] References Cited

U.S. PATENT DOCUMENTS

| | | | |
|---|---|---|---|
| 4,779,089 | 10/1988 | Theus | 340/825.5 |
| 5,502,821 | 3/1996 | Nguyen et al. | 395/280 |
| 5,544,333 | 8/1996 | Frazier et al. | 395/304 |
| 5,689,657 | 11/1997 | Desor et al. | 395/299 |
| 5,696,910 | 12/1997 | Pawlowski | 395/280 |
| 5,761,697 | 6/1998 | Curry et al. | 711/100 |
| 5,764,929 | 6/1998 | Kelley et al. | 395/287 |
| 5,812,796 | 9/1998 | Broedner et al. | 395/283 |

*Primary Examiner*—Ayaz R. Sheikh
*Assistant Examiner*—Eric S. Thlang
*Attorney, Agent, or Firm*—Ronald L. Chichester; Paul N. Katz; Frohwitter

[57] ABSTRACT

A method and apparatus of assuring uniqueness of identification numbers of bus devices connected to a bus. Each bus device has a current identification number. At each of the bus devices, an identification number is received on a bus and the bus is contended for based on the received identification number. If more than one bus device is detected contending for the bus, the current identification number of one of the bus devices is changed. Each of the bus devices compares the received identification number to the current identification number of the bus device. A bus device provides a match indication, including driving a signal, if the comparison produces a match. Each bus device includes a collision detector for detecting if more than one bus device is driving the signal.

12 Claims, 9 Drawing Sheets

AVOIDING NON-UNIQUE IDENTIFIERS FOR BUS DEVICES

BACKGROUND

The invention relates to assigning identification numbers to computer system devices.

To avoid contention between multiple devices connected to a computer system bus, each bus device typically is assigned a distinct address space, with the bus devices selected using bus address lines. Thus, only one bus device responds to a bus transaction having a given address specified on the address lines.

Figure 1:
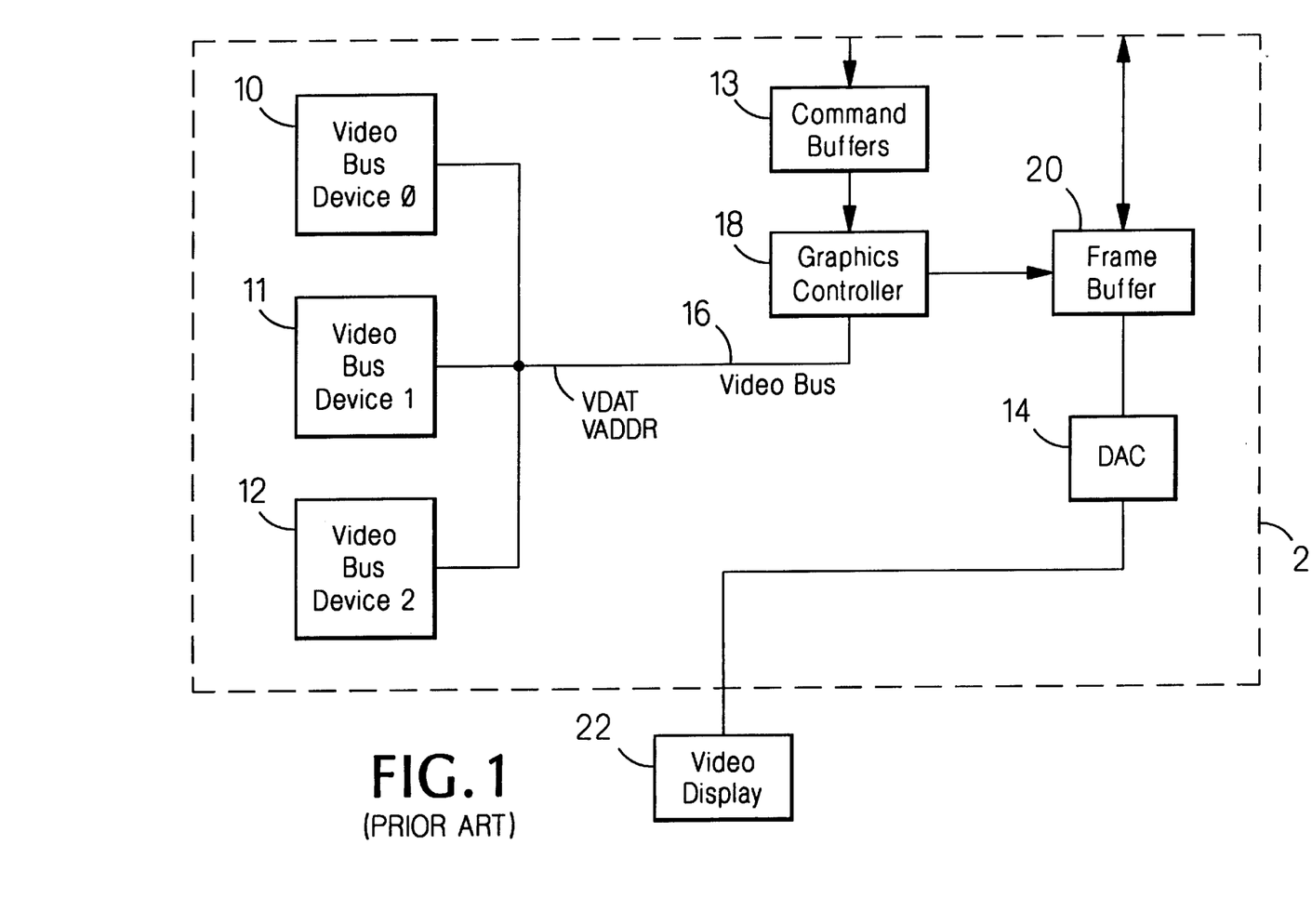
FIG. 1 is a block diagram of a video board.

A computer system generally contains several layers of buses, including a host bus, an expansion bus, and buses contained in some peripheral boards. Referring to FIG. 1, an exemplary video board 2 includes a video bus 16 (which can be the VMI or Scenic Highway bus) connected to bus devices 10, 11, and 12, which are bus slaves. A graphics controller 18 is connected to the video bus 16 as a bus master. The video board 2 includes a frame buffer 20 for storing video data and a digital-to-analog (DAC) circuit 14 for transmitting video data to a video display 22.

The video bus 16 includes data lines VDAT and address lines VADDR as well as a clock signal, vertical and horizontal synchronization signals, and other control signals. Each of the bus devices 10, 11, and 12 is assigned a separate address space selectable by the address lines VADDR. The number of address lines required depends on the total address space of the video bus 16 and the number of devices that can potentially be connected to the bus.

SUMMARY

In general, in one aspect, the invention features a method of assuring uniqueness of identification numbers of bus devices connected to a bus, each bus device having a current identification number. At each of the bus devices, an identification number is received on the bus and the bus is contended for based on the received identification number. If more than one bus device is detected contending for the bus, the current identification number of one of the bus devices is changed.

Implementations of the invention may include one or more of the following features. At each of the bus devices, the received identification number is compared to the current identification number of the bus device, and a match indication is provided if the comparison produces a match. The detecting includes determining if more than one of the bus devices has provided a match indication. The match indication includes a signal, and each bus device includes a collision detector. The detecting includes the collision detector detecting if more than one bus device is driving the signal.

In general, in another aspect, the invention features a method of regulating access to bus devices connected to a bus. In each of the bus devices, unique identifiers are dynamically assigned to the respective bus devices. Thereafter, access is obtained to a desired one of the bus devices by placing its unique identifier on the bus.

Implementations of the invention may include one or more of the following features. The unique identifiers are assigned in each bus device by detecting if more than one bus device responds to an identifier generated on the bus. The current identifier of the bus device is changed if more than one bus device is responding to the received bus identifier.

In general, in another aspect, the invention features a method of configuring bus devices connected to a bus, the bus devices having identifiers used for accessing the bus devices, and at least two of the identifiers being non-unique. In each of the bus devices, a collision detection protocol is used on the bus to determine the existence of non-unique identifiers assigned to the bus devices. Identifiers are dynamically reassigned to the bus devices to reduce the number of non-unique identifiers.

In general, in another aspect, the invention features a bus device having a port configured to connect the bus device to a computer bus, and circuitry configured to establish an identifier for the bus device for use in accessing the bus device on the bus. The circuitry is also configured to cooperate with other circuitry connected to the bus to establish a different identifier to eliminate non-unique identifiers among bus devices connected to the bus.

Implementations of the invention may include one or more of the following features. The circuitry includes a collision detector and an identifier generator. The collision detector detects if more than one bus device is responding to an identifier generated on the bus, and if so, the identifier generator changes the identifier of the bus device.

In general, in another aspect, the invention features a bus controller having a port configure to connect the bus controller to a computer bus, and circuitry configured to cooperate with bus devices connected on the bus. Each of the bus devices has a changeable identifier used for accessing the device on a bus, and the circuitry is configured to cooperate with the bus devices to change identifiers to assure that the identifiers of the respective bus devices are unique.

Implementations of the invention may include one or more of the following features. The circuitry includes an identifier assignment circuit for generating a sequence of identifiers on the bus during an identifier assignment operation. Each bus device includes an identifier controller, the identifier controllers cooperating with each other to assign unique identifiers to each bus device in response to the sequence of identifiers on the bus. The identifier assignment circuit is configured to receive a successful assignment indication generated by an identifier controller when a bus device has been assigned a unique identifier.

In general, in another aspect, the invention features a computer system having a bus and bus devices connected to the bus. Each bus device has an identification generator for assigning a current identification number. A controller generates an identification number on the bus, and each bus device detects contention on the bus to determine if more than one bus device is responding to the bus identification number. The identification generator of one bus device changes its identification number if bus contention is detected.

Implementations of the invention may include one or more of the following features. Each bus device produces a match indication if the bus identification number is equal to its initial identification number. The identification generator of one bus device changes its identification number if more than one bus device has produced a matched indication. The match indication includes a signal, and each bus device includes a collision detector for detecting if more than one bus device is driving the signal.

In general, in another aspect, the invention features a computer system having a signal line, a first device connected to the signal line and having control logic, and a second device connected to the signal line. Each of the first and second devices are capable of driving the signal, and the first device includes a collision detector connected to the signal. If both the first and second devices are driving the signal at the same time, the collision detector provides a collision indication to the device's control logic.

In general, in another aspect, the invention features a computer system having a bus and bus devices connected to the bus. Each bus device uses a collision detection protocol on the bus to determine the existence of non-unique identifiers assigned to the bus devices. Each bus device includes circuitry configured to dynamically reassign the identifier of the bus devices to eliminate non-unique identifiers.

In general, in another aspect, the invention features an apparatus for assigning distinct identification numbers to bus devices connected to a bus. An identification generator in each bus device assigns a current identification number to the bus device. A controller generates an identification number on the bus. A collision detector in each bus device detects for contention on the bus to determine if more than one bus device is responding to the bus identification number. The identification generator of one bus device changes its identification number if bus contention is detected.

In general, in another aspect, the invention features a computer system having a bus, an identification generator in each bus device for assigning a current identification number to the bus device, and a controller for generating an identification number on the bus. The identification generator drives a signal if its identification number matches the bus identification number. A collision detector in each bus device detects if more than one bus device is driving the signal. The identification generator of one bus device changes its identification number if more than one bus device is driving the signal. A mass storage system is accessible by the bus devices.

Advantages of the invention may include one or more of the following. Using the identification number addressing scheme, the number of pins required to address or select a bus device is reduced. Bus devices can determine whether more than one bus device has been assigned the same identification number (by monitoring for bus contention internally) without the interaction of system software or a central controller.

Other advantages and features will be apparent from the following description and claims.

DESCRIPTION

Figure 2:
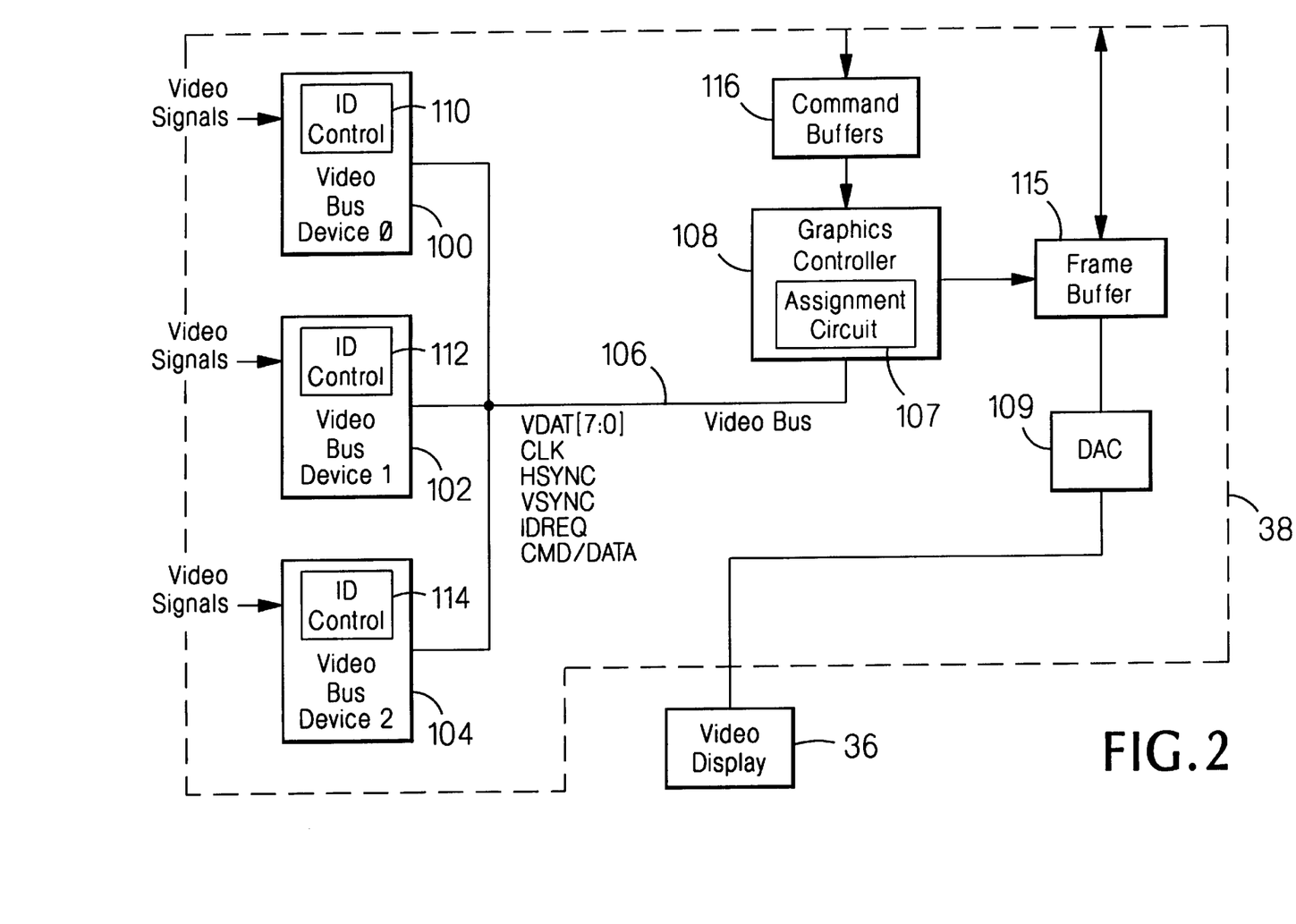
FIG. 2 is a block diagram of a video board including devices having identification controllers for assigning identification numbers to bus devices.

Referring to FIG. 2, a video board 38 includes video bus devices 100, 102, and 104, and a graphics controller 108 connected to a video bus 106 having data lines VDAT[7:0]. The width of the video data bus can be wider, such as 16 bits. The bus devices 100, 102, and 104 can be video decoders, such as NTSC, PAL, or SECAM decoders, for receiving signals from video sources. Video images from the video sources are combined by the graphics controller 108 for display in standard computer graphical user interface (GUI) format.

The bus devices 100, 102, and 104 include identification controllers 110, 112, and 114, respectively, for assigning identification (ID) numbers to their respective bus devices. The ID number of each bus device is assigned in an ID assignment operation during computer system initialization by a system controller. Once unique ID numbers are assigned to the bus devices, the bus devices are addressed or selected in video bus transactions using the video bus data lines to provide an identification number. By using such an ID number addressing scheme, the video bus width is minimized since dedicated address lines can be avoided.

The video bus 106 includes a clock signal CLK, an identification request signal IDREQ, a command/data signal CMD/DATA, a horizontal synchronization signal HSYNC, and a vertical synchronization signal VSYNC. The graphics controller 108 is a bus master while the bus devices 100, 102, and 104 are slaves on the video bus 106.

Figure 9:
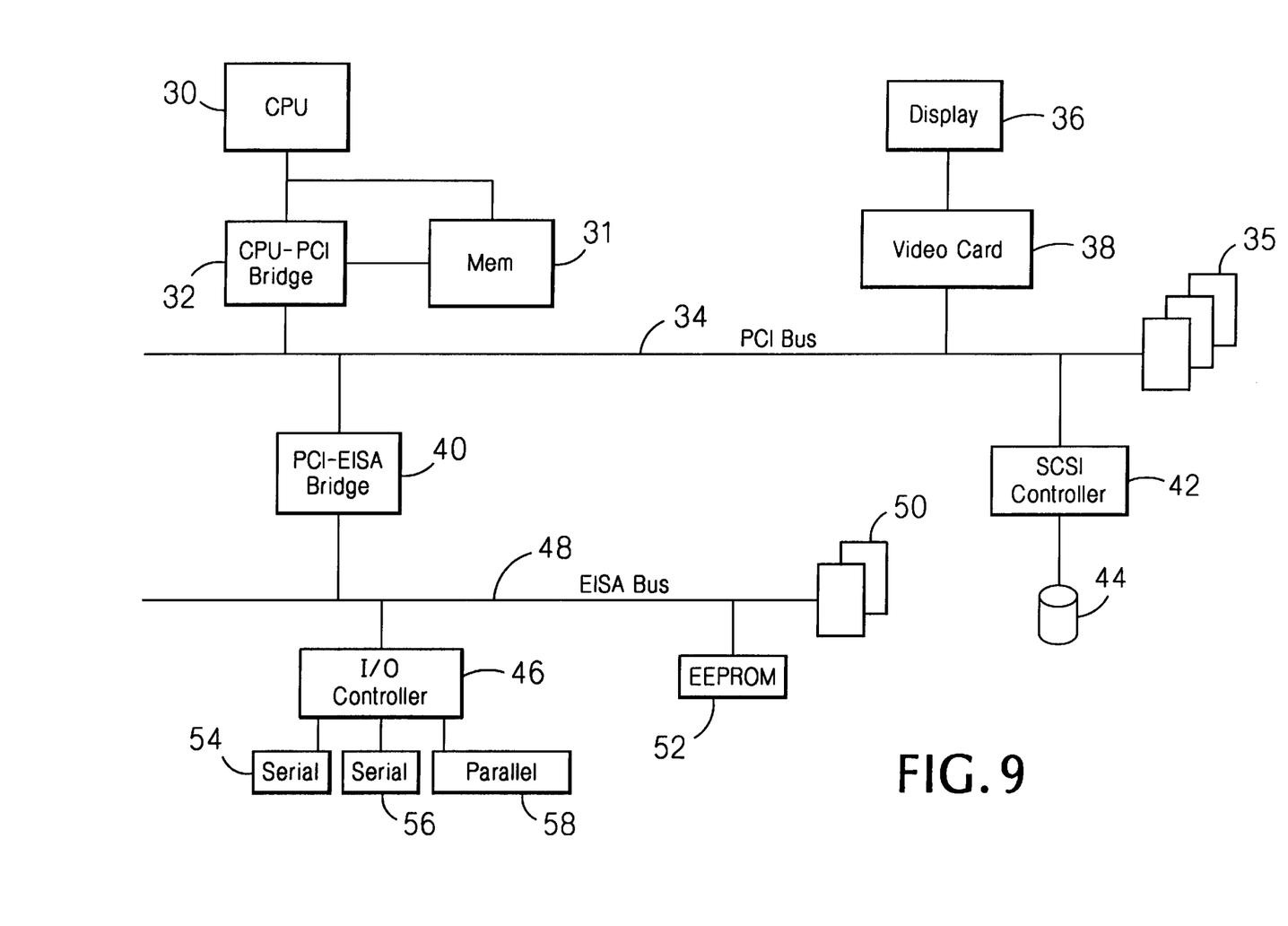
FIG. 9 is a block diagram of a computer system.

Commands to the graphics controller 108 from the computer system are presented to command buffers 116 over a system bus 34 (FIG. 9). Under control of the graphics controller 108, video data can be written to or read from a frame buffer 115 over the system bus 34. The contents of the frame buffer 115 are provided to a digital-to-analog (DAC) circuit 109 for transmission to a video display 36. Alternatively, in a digital video system, the graphics controller 108 can provide signals directly to a digital video display.

During computer system initialization, the ID controllers 110, 112, and 114 along with an ID assignment circuit 107 in the graphics controller 108 assign distinct ID numbers to bus devices 100, 102, and 104. Each ID number can range from 0 to 14, with an initial default ID number assigned by the manufacturer to each device. Since the same default ID number coincidentally may be assigned by manufacturers to more than one bus device, the ID controllers 110, 112, and 114 are capable of internally changing their assigned ID numbers until each bus device has been assigned a distinct number.

The ID assignment circuit 107 in the graphics controller 108 cycles through ID numbers 0–14 on the video bus 106 until each ID controller 110, 112, or 114 has indicated it has been assigned a distinct ID number. To identify if more than one bus device has been assigned the same ID number during the ID assignment operation, each ID controller 110, 112, or 114 can detect bus contention as a result of more than one bus device attempting to respond to the same ID number on the video bus 106.

Figure 3:
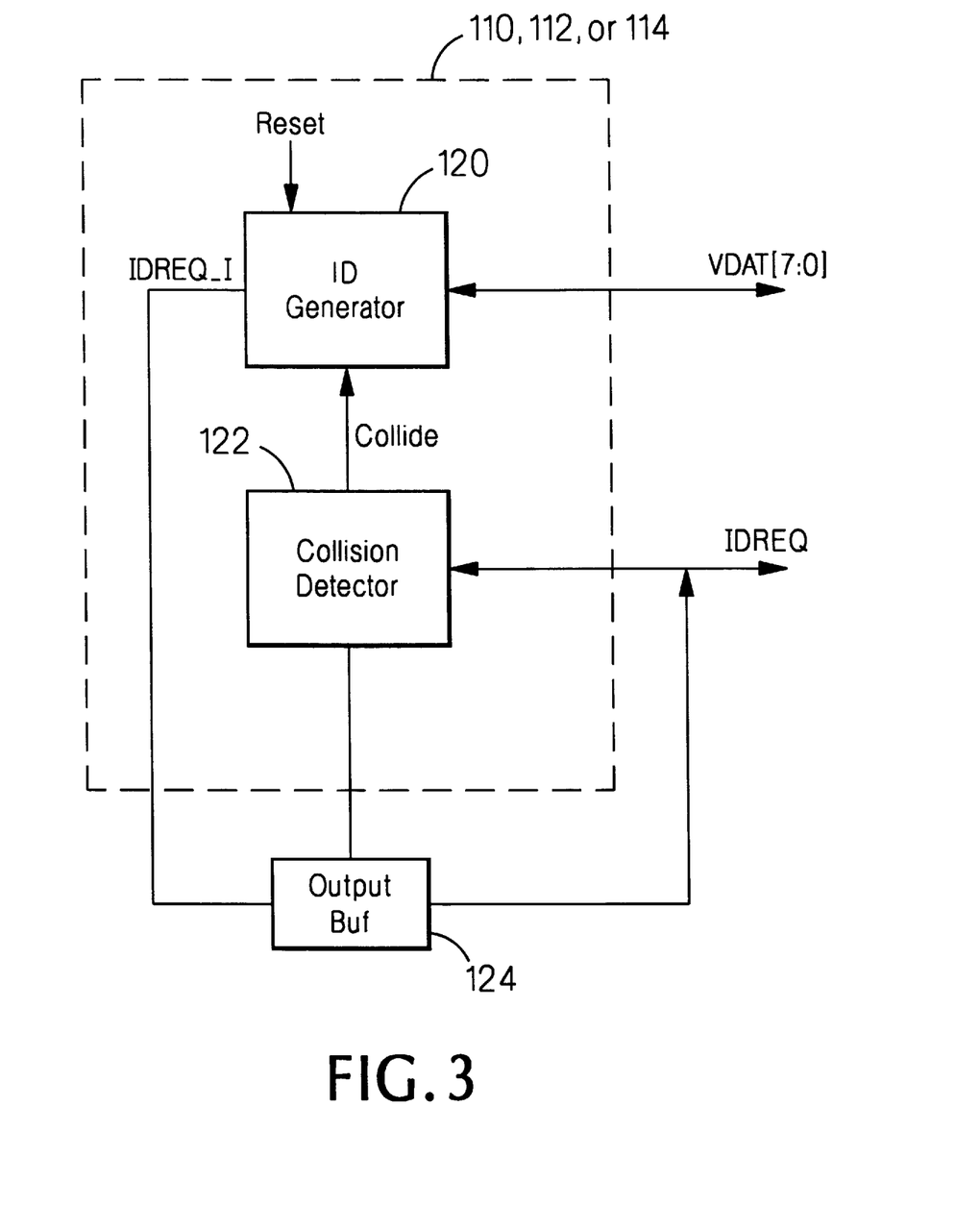
FIG. 3 is a block diagram of an identification controller.

Referring to FIG. 3, each ID controller 110 includes a collision detector 122 and an ID generator 120. Each ID generator 120 initially assigns a default ID number between 0 and 14. The ID generator 120 indicates to the assignment circuit 107 that it needs to be assigned an ID number by asserting the signal IDREQ low. During the ID assignment operation, the ID assignment circuit 107 in the graphics controller 108 (FIG. 2) generates, in a series of cycles, ID numbers 0–14 on the lower nibble VDAT[3:0] of the video bus data lines. If the ID number on VDAT[3:0] is equal the ID number of an ID generator 120, the ID generator 120 responds by asserting a signal IDREQ_I high to the output buffer 124, which in turn drives the signal IDREQ active low. In the next video bus cycle, the responding ID generator 120 drives its ID number onto the upper nibble VDAT[7:4] of the video bus data lines, which is received by the graphics controller 108.

The collision detector 122 detects collisions on the signal IDREQ (i.e., multiple bus devices driving the signal IDREQ at the same time). Each collision detector 122 receives the signal IDREQ, which is an open-collector signal driven low by each output buffer 124. If more than one bus device is attempting to drive the signal IDREQ, the collision detector 122 in each bus device driving the signal IDREQ asserts a signal COLLIDE to the ID generator 120 to indicate that a collision has occurred. If a collision is detected, the ID generator 120 responds by negating the signal IDREQ_I high and generating another random ID number internally.

Figure 4:
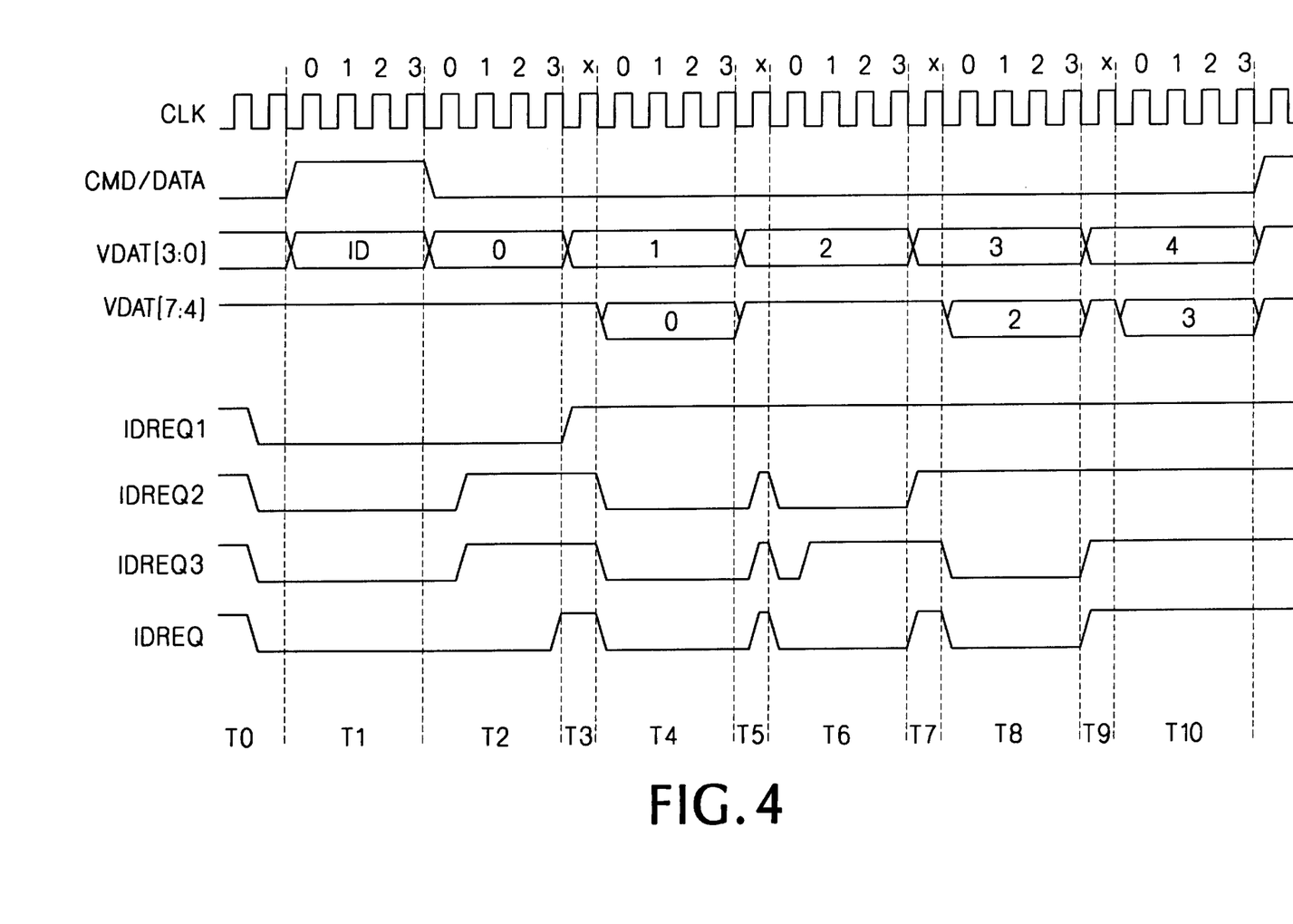
FIG. 4 is a timing diagram of an identification assignment operation.

Referring further to the timing diagram of FIG. 4, a timing diagram shows an ID assignment operation on the video bus 106. Each video bus cycle contains four CLK periods, with an extra X clock added between some cycles to allow the collision detectors 122 to detect collision on the signal IDREQ. In the example, the bus device 100 is initially assigned a default ID number 0, and both bus devices 102 and 104 are initially assigned the same default ID number 1. When a collision between bus devices 102 and 104 is detected in time periods T4 and T5, the ID generator 120 in each bus device 102 and 104 changes the internally assigned ID number of the bus devices 102 and 104 to random ID numbers 2 and 3, respectively.

Signals IDREQ1, IDREQ2, and IDREQ3 are associated with ID controllers 110, 112, and 114, respectively, and represent the inverted state of the signal IDREQ_I generated by each ID generator 120. Effectively, the signal IDREQ is a logical OR of signals IDREQ1, IDREQ2, and IDREQ3. In response to detection of an active IDREQ signal in period T0, the ID assignment circuit 107 in the graphics controller 108 generates an ID command in period T1 to begin the ID assignment operation. In subsequent cycles from period T2 until period T10, the ID assignment circuit 107 generates ID numbers 0–14 on the lower nibble VDAT [3:0] until each bus device has been assigned a distinct ID number. A bus device will indicate a successful assignment of an ID number by driving its ID number back on the upper nibble VDAT[7:4] of the video bus data lines. Thus, for example, in response to the ID number 0 on VDAT[3:0] generated by the ID assignment circuit 107 in period T2, the ID controller 110 of the bus device 100 drives the ID number 0 on VDAT[7:4] in period T4. Similarly, the ID controllers 112 and 114 in bus devices 102 and 104 indicate successful ID assignments by driving numbers 2 and 3, respectively, onto VDAT[7:4] in periods T8 and T10, respectively.

Periods T4 and T5 show a collision occurring when both ID controllers 112 and 114 respond to ID number 1 on VDAT[3:0] (i.e., signals IDREQ2 and IDREQ3 are both remain asserted low). The collision on IDREQ is detected by the collision detectors during the X CLK in period T5. As a result of the collision, neither the ID controller 112 nor 114 drives its ID number onto VDAT[7:4] in period T6, which indicates to the ID assignment circuit 107 in the graphics controller 108 that no bus device has been assigned ID number 1.

Figure 5:
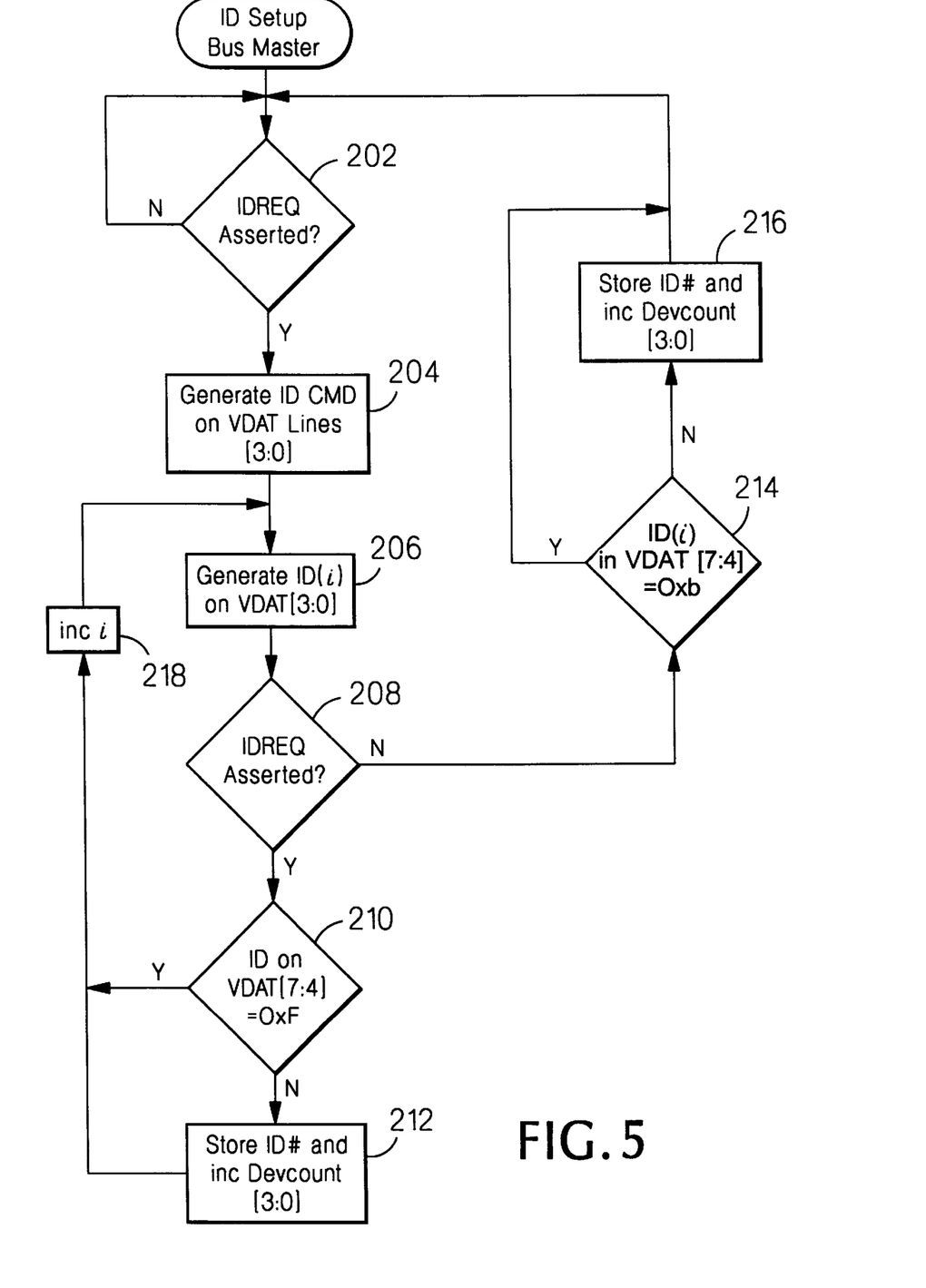
FIGS. 5 and 6 are flow diagrams of the identification assignment operation.
Figure 6:
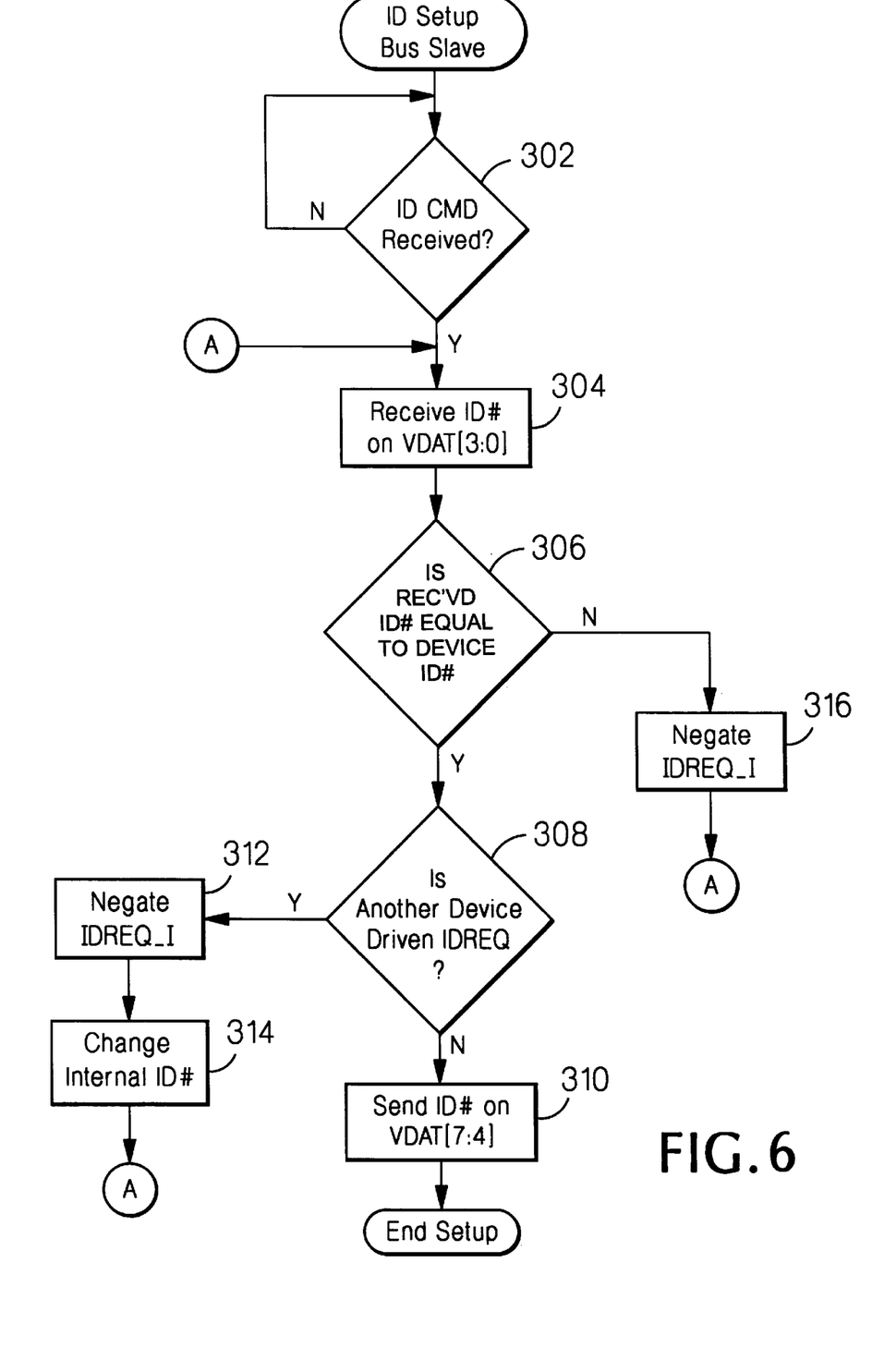

Referring to FIGS. 5 and 6, the steps of the ID assignment circuit 107 in the graphics controller 108 and each ID generator 120 during the ID assignment operation are shown. In FIG. 5, after initialization of the computer system, the ID generator 120 of each bus device 100, 102, or 104 drives its respective signal IDREQ1, IDREQ2, or IDREQ3 low in time period T0.

When the ID assignment circuit 107 detects at step 202 that the signal IDREQ has initially been asserted, it generates an ID command on the video bus 106 (in period T1), which includes asserting the CMD/DATA signal high and placing the ID command value on the lower nibble VDAT [3:0] of the video bus data lines. The ID command cycle indicates to the ID controllers 110, 112, and 114 that an ID assignment operation is beginning.

In the next bus cycle (period T2), the ID assignment circuit 107 generates at step 204 a first ID number ID(i) (initially 0) on the lower nibble VDAT[3:0] of the video bus data lines. In clock 1 of period T2, the ID assignment circuit 107 next checks at step 208 if the signal IDREQ is asserted low by one or more of the bus devices to indicate that one or more ID assignments are required. In period T2, all three signals IDREQ1, IDREQ2, and IDREQ3 are asserted low since none of the bus devices have been assigned an ID number by the ID assignment circuit 107 yet.

In response to the ID number ID(i) on VDAT[3:0], an ID controller maintains its signal IDREQ1, IDREQ2, or IDREQ3 low if the number ID(i) matches the internally generated ID number of the ID controller. In time period T2, for example, the matching device is the ID controller 110, which maintains its signal IDREQ1 asserted, while the non-matching ID controllers 112 and 114 deassert their signals IDREQ2 and IDREQ3 in clock 1. Next, in period T4, the matching ID controller 110 then drives its ID number on the upper nibble VDAT[7:4] of the video bus data lines.

If the signal IDREQ is detected as asserted at step 208, the ID assignment circuit 107 then determines at step 210 if the ID number driven by the responding bus device on the upper nibble VDAT[7:4] is equal to the hexadecimal value F. If none of the ID controllers drive the upper nibble VDAT [7:4], pull-up resistors (not shown) will pull the signals high. If the upper nibble VDAT[7:4] is not equal the hexadecimal value F, such as in period T4, then a successful ID assignment has been performed and the ID number is stored at step 212 in the ID assignment circuit 107. A device count variable DEVCOUNT[3:0] is also incremented at step 212 so that the ID assignment circuit 107 can keep track of the number of bus devices on the video bus 106.

If all the bus devices have deasserted their respective signals IDREQ1, IDREQ2, and IDREQ3 at step 208 to indicate that each bus device has been assigned an ID number (such as in time period T10), the ID assignment circuit 107 next determines at step 214 if the ID number driven by an ID controller on the upper nibble VDAT[7:4] of the video bus data lines is equal to the hexadecimal value F. If not, then a matching ID controller has responded by driving its ID number on VDAT[7:4], and as a result, the ID assignment circuit 107 stores at step 216 the value of VDAT[7:4] and increments the bus device count variable DEVCOUNT[3:0].

From step 210 (if the value of the upper nibble VDAT [7:4] contains the hexadecimal value F), or from step 212, the ID assignment circuit 107 next increments the variable i at step 218. The ID number driven by the ID assignment circuit 107 on the lower nibble VDAT[3:0] of the video bus data lines is then incremented at step 206. The process continues until each bus device has been assigned an ID number. The ID assignment circuit 107 increments ID(i) to a maximum of 16 and wraps ID(i) around to zero if necessary to continue incrementing ID(i) until all bus devices have been assigned distinct ID numbers.

Referring to FIG. 6, each ID generator 120 in the ID controllers 110, 112, and 114 waits for the ID command from the graphics controller 108 to begin the ID assignment process. If the ID command is received at step 302, the ID generator 120 next receives at step 304 the ID number generated by the graphics controller 108 on the lower nibble VDAT[3:0] of the video bus data lines. Next, the ID generator 120 compares at step 306 the received ID number with its internally generated device ID number. If there is a match, the ID generator 120 next determines at step 308 if another device is driving the signal IDREQ (as determined by the state of the signal COLLIDE). The collision detection is performed in the X clock, that is, periods T3, T5, T7, and T9 of the timing diagram.

If more than one device is driving the signal IDREQ (such as in period T5 of the timing diagram), then a collision has occurred, and the ID generator 120 deasserts at step 312 the signal IDREQ_I. Next, at step 314, the ID generator 120 reassigns its internal ID number and proceeds back to step 304 to receive the next ID number generated by the ID assignment circuit 107. Thus, in the example of FIG. 4, the ID controller 112 (which was initially assigned the ID number 1) generates another random number, in this case the number 2. The ID controller 114 (which also was initially assigned the ID number 1) is reassigned the random ID number 3.

If it is determined at step 308 that another bus device is not driving the signal IDREQ, then the ID number of the bus device is unique and the ID generator 120 responds by transmitting the ID number on video bus data lines VDAT [7:4] in the next bus cycle to the ID assignment circuit 107 (such as in periods T4, T8, and T10).

If the ID number received from the ID assignment circuit 107 is not equal to the internally assigned device number, then the signal IDREQ_I is negated at step 316 by the ID generator 120 (such as signals IDREQ2 and IDREQ3 in clock 1 of period T2). The ID generator 120 then receives at step 304 the next ID number generated by the graphics controller 108.

Figure 7:
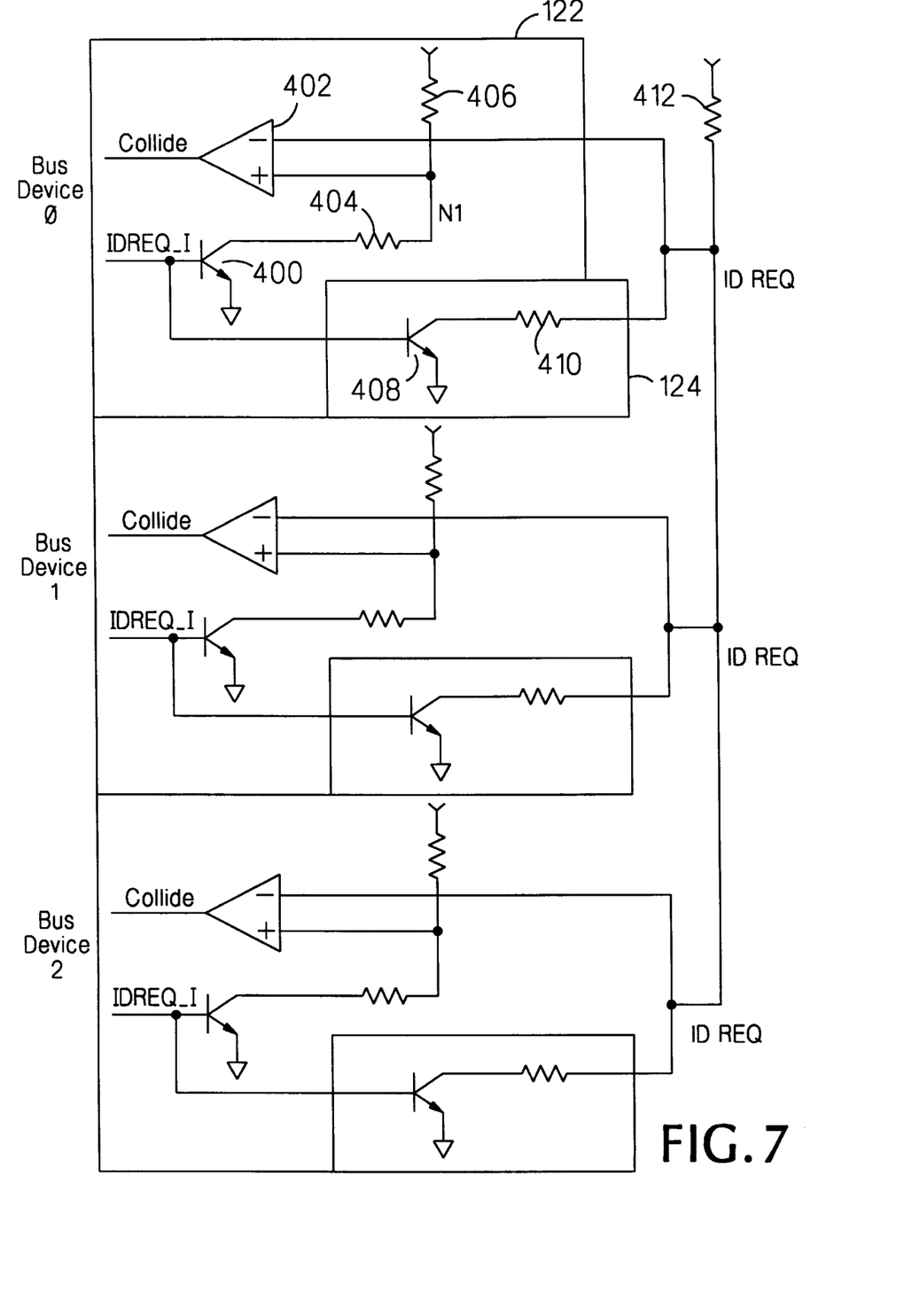
FIG. 7 is a schematic diagram of collision detectors.

Referring to FIG. 7, the collision detector 122 and output buffer 124 of each of the bus devices 100, 102, and 104 are shown. The signal IDREQ is an open collector signal that is pulled high externally by a weak pull-up resistor 412. Each collision detector 122 includes a differential amplifier 402, resistors 404 and 406, and an NPN transistor 400. Each output buffer 124 includes an output NPN transistor 408 whose collector drives the signal IDREQ through a resistor 410.

The signal IDREQ is provided to the inverting input of the differential amplifier 402, with the non-inverting input connected to the common node N1 of a voltage divider formed by the resistors 404 and 406. The output of the differential amplifier 402 drives the signal to COLLIDE. The voltage drop across the resistors 404 and 406 in the collision detector 122 are chosen to match the voltage drop across the resistors 412 and 410 at the IDREQ output stage with only one device driving the IDREQ line. The signal IDREQ_I driven by the ID generator 120 is provided to both the base of the transistor 400 and the base of the transistor 408.

Figure 8:
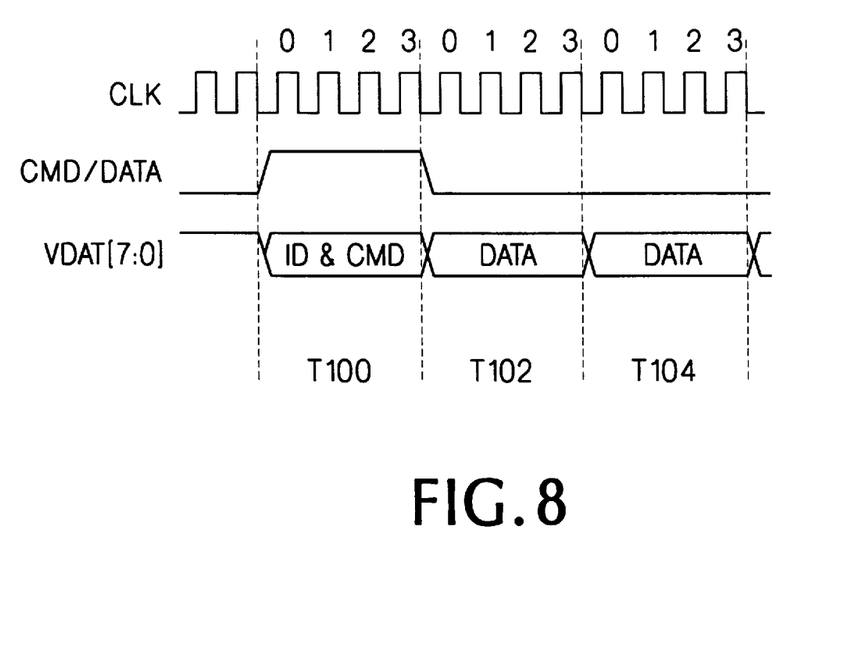
FIG. 8 is a timing diagram of a bus transaction.

If more than one output buffer 124 is driving the signal IDREQ, the voltage of the signal IDREQ will be lower than the voltage at node N1 in the collision detector 122 (if the signal IDREQ_I is active high). The signal IDREQ is lower because more than one transistor is pulling the signal low. Thus, if the voltage at node N1 is greater than the voltage at IDREQ by a predetermined threshold voltage, the differential amplifier 402 drives the signal COLLIDE high. If the voltage at node N1 is less than the voltage at IDREQ by less than the predetermined threshold voltage, the signal COLLIDE is maintained low. the ID numbers for each bus device on the video bus 106 have been assigned, each of the bus devices 100, 102, and 104 can be addressed by the graphics controller 108 by presenting an ID number on the video bus data lines. Referring to FIG. 8, the ID number is provided during the command cycle (the signal CMD/DATA is high) in period T100. During the command cycle, the ID number of one of the bus slave devices 100, 102, and 104 is placed on the lower nibble of the data lines VDAT[7:0], and the command (e.g., write or read transaction) is placed on the upper nibble. After the command cycle, in period T102, the signal CMD/DATA is negated low, and the video write or read data is presented onto the data lines VDAT[7:0]. Subsequent data cycles can also be generated to the selected bus slave device.

One advantage of the system described is that the width of the video bus is reduced by using the ID number addressing scheme. Another advantage is that circuitry in each bus device is capable of detecting collision on a particular signal line. The detection capability allows any collision to be resolved internally in a bus device, thereby avoiding the need for bus system software or some other central controller to become involved in resolving the collision, which can be costly in terms of speed and amount of system resources used.

Referring to FIG. 9, the video card 38 is connected in a computer system to a Peripheral Component Interconnect (PCI) bus 34. Also connected to the PCI bus 34 is a CPU-PCI bridge 32 connected to a central processing unit (CPU) 30 and a main memory 31. The PCI bus 34 is also connected to a SCSI controller 42 (or alternatively an IDE controller), which is connected to a mass storage device 44, such as hard disk drives or a CD-ROM. The PCI bus is also connected to PCI slots 35 for connection to PCI devices.

Devices on the PCI bus 34 communicate with an expansion bus 48, such as the Extended Industry Standard Architecture (EISA) bus, through a PCI-EISA bridge 40. Alternatively, the expansion bus can be an Industry Standard Architecture (ISA) bus. The EISA bus 48 includes expansion slots 50 for connection to expansion boards. Also connected to the EISA bus 48 is a non-volatile memory 52 (such as an EEPROM device) for storing such information as the BIOS and initialization code. Also connected to the EISA bus 48 is an input/output (I/O) controller 46, which is connected to serial ports 54 and 56 (for connection to a keyboard and a pointer device) and a parallel port 58 (for connection to a printer device).

Other embodiments are within the scope of the following claims. For example, the addressing scheme in which ID numbers are assigned and used can be applied to any computer system bus. The range of ID numbers can be expanded to as many as are necessary for bus devices on a bus.

What is claimed is:

1. A method of assuring uniqueness of identification numbers of bus devices connected to a bus, each bus device having a current identification number, the method comprising:

at each of the bus devices, receiving an identification number on the bus and contending for the bus based on the received identification number;

detecting if more than one bus device is contending for the bus, and, if so, changing the current identification number of one of the bus devices;

at each of the bus devices, comparing the received identification number to the current identification number of the bus device, and providing a match indication if the comparison produces a match;

wherein the step of detecting includes determining if more than one of the bus devices has provided a match indication; and wherein the match indication includes a signal, and each bus device includes a collision detector, and wherein the detecting includes the collision detector detecting if more than one bus device is driving the signal.

2. A computer system, comprising:

a bus;

bus devices connected to the bus, each bus device having an identification generator for assigning a current identification number; and a controller for generating an identification number on the bus, wherein each bus device detects contention on the bus to determine if more than one bus device is responding to the bus identification number, wherein the identification generator of one bus device changes its identification number if bus contention is detected.

3. The computer system of claim 2, wherein each bus device produces a match indication if the bus identification number is equal to its initial identification number, and wherein the identification generator of one bus device changes its identification number if more than one bus device has produced a match indication.

4. The computer system of claim 3, wherein the match indication includes a signal, and each bus device further includes a collision detector for detecting if more than one bus device is driving the signal.

5. A computer system, comprising:

a bus; and bus devices connected to the bus, each bus device using a collision detection protocol on the bus to determine the existence of non-unique identifiers assigned to the bus devices, and wherein each bus device includes circuitry configured to dynamically reassign the identifier of the bus devices to eliminate non-unique identifiers.

6. The computer system of claim 5, wherein each bus device includes a collision detector and an identifier generator, the collision detector detecting if more than one bus device is responding to an identifier generated on the bus, and if so, the identifier generator changing the identifier of one bus device.

7. The computer system of claim 5, further comprising:

a controller connected to the bus and including circuitry configured to cooperate with the bus devices in the collision detection protocol to assign unique identifiers to the bus devices.

8. The computer system of claim 7, wherein the circuitry of the controller is further configured to generate a sequence of identifiers on the bus, wherein detection in a bus device that more than one bus device has responded to one of the sequence of identifiers indicates that a collision has occurred that requires reassignment of the identifier of one bus device.

9. Apparatus for assigning distinct identification numbers to bus devices connected to a bus, the apparatus comprising:

an identification generator in each bus device for assigning a current identification number to the bus device; and a controller for generating an identification number on the bus; and a collision detector in each bus device for detecting contention on the bus to determine if more than one bus device is responding to the bus identification number, wherein the identification generator of one bus device changes its identification number if bus contention is detected.

10. The apparatus of claim 9, wherein each bus device produces a match indication if the bus identification number is equal to its initial identification number, and wherein the identification generator of one bus device changes its identification number if more than one bus device produces a match indication.

11. The apparatus of claim 10, wherein the match indication includes a signal, and the collision detector of each bus device detects if more than one bus device is driving the signal.

12. A computer system, comprising:

a bus;

an identification generator in each bus device for assigning a current identification number to the bus device; and a controller for generating an identification number on the bus, wherein the identification generator drives a signal if its identification number matches the bus identification number;

a collision detector in each bus device for detecting if more than one bus device is driving the signal, wherein the identification generator of one bus device changes its identification number if more than one bus device is driving the signal; and a mass storage system accessible by the bus devices.

* * * * *